United States Patent Office.

PETER MÖLLER HEYERDAHL, OF TRONDHJEM, ASSIGNOR TO PETER MÖLLER, OF CHRISTIANIA, NORWAY.

PROCESS OF MAKING COD-LIVER OIL.

SPECIFICATION forming part of Letters Patent No. 459,873, dated September 22, 1891.

Application filed October 17, 1890. Serial No. 368,463. (No specimens.)

*To all whom it may concern:*

Be it known that I, PETER MÖLLER HEYERDAHL, a citizen of the Kingdom of Norway, residing at Trondhjem, in Norway, have invented certain new and useful Improvements in the Manufacture of Cod-Liver Oil; and I do hereby declare the following to be a full, clear, and exact description of the invention, such as will enable others skilled in the art to which it appertains to make and use the same.

My invention relates to the manufacture of cod-liver oil, and more especially to the process employed in said manufacture whereby the oil contained in the liver is caused to separate from the more solid constituents thereof; and my invention has for its object to provide a process whereby the oil obtained will be very nearly, if not quite, free from any unpleasant taste such as usually characterizes the oil obtained by the ordinary processes. As is well known, the production of cod-liver oil is effected by heating the fresh liver to a moderate temperature, either by means of steam applied directly or indirectly, or by fire, or in some other suitable manner. It is also well known that the quality of the product obtained depends largely upon the length of time employed for separating the oil from the cellular substances of the liver, as well as upon the degree of temperature applied, the highest grade of oil being obtained when the temperature has been the lowest possible and the process of the shortest possible duration. Now it is a matter of experience that the cod-liver oil so obtained can never be quite freed from an unpleasant taste, however careful the processes above named may have been carried out and whatever the process of refining the oil may be afterward. For this reason the use of cod-liver oil as a medicine has been more limited than it should be in view of its superior prophylactic and therapeutic properties. Up to the present time it has never been ascertained what the source of this unpleasant taste is, and I have made many experiments for this purpose and to disclose the chemical properties of the oil. In the course of my experiments I found that the cod-liver oil obtained in the described manner contained substances or acids which are foreign to the natural oil as contained in the liver, and which substances or acids seemed to be formed by reason of the combined action of the air and the heat. I then made similar experiments, but employed a closed vessel from which the air had been expelled by forcing thereinto an inert gas, such as carbonic-acid gas or hydrogen, and found that the quantity of such foreign substances formed during the experiments was reduced to almost nothing. This result convinced me that the said foreign substances were formed during the heating process under the action of the air.

In carrying out my method I proceed as follows: I first charge the livers to be treated into the vessel or vat, after which the latter is closed air-tight. I then withdraw or expel all the air from the vessel, and this may be effected by any of the usual methods; but I preferably effect this by forcing an inert gas—such as hydrogen, nitrogen, or carbonic acid—into the vessel until all the air has been forcibly expelled from the latter. I then cease forcing the gas into the vessel and apply heat to the latter sufficient to effect the separation of the oil from the livers, after which the contents of the vessel are cooled down to the temperature of the atmosphere. The oil obtained may afterward be refined by any of the well-known refining processes.

My process may be carried out in any existing plant without necessitating material changes, as in most cases the old vats may be used when provided with air-tight covers and with pipes for charging them with gas and for expulsion of air.

It will be understood that I maintain the exclusion of all air during the separation of the oil, which is not the case with the separating processes heretofore practiced, wherein steam is introduced into the vat, which steam condenses and the water of condensation mixes with the material treated. In said processes the steam carries with it a greater or less quantity of air sufficient to render oxidation of the acids in the cod-livers possible. Therefore by not admitting the steam into the vat I prevent any air being carried into said vat or water mixing with the livers and oil separated therefrom, and thus secure the perfect working of the process.

What I claim, and desire to secure by Letters Patent, is—

1. The herein-described process of obtaining cod-liver oil, consisting in the following steps, to wit: first, charging the vat with cod-livers; secondly, closing the vat air-tight; thirdly, expelling the air completely from the vat and maintaining the exclusion of the air until after the separation of the oil; fourthly, heating the livers; and, fifthly, cooling the contents of the vat and removing the oil obtained.

2. The herein-described process of obtaining cod-liver oil, consisting in the following steps, to wit: first, charging the vat with cod-livers; secondly, closing the vat air-tight; thirdly, expelling the air from the vat by charging the latter with an inert gas, such as hydrogen, nitrogen, or carbonic acid; fourthly, heating the livers in the presence of such inert gas, and, fifthly, cooling the contents of the vat and removing the oil obtained.

In testimony whereof I affix my signature in presence of two witnesses.

PETER MÖLLER HEYERDAHL.

Witnesses:
MORTEN MÜLLER,
JULIUS DÖCKER SMITH.